United States Patent [19]

Chamberlin et al.

[11] Patent Number: 5,722,643
[45] Date of Patent: Mar. 3, 1998

[54] TEMPERATURE COMPENSATED SAFETY GAS SPRING

[75] Inventors: James B. Chamberlin; Alfred W. Siman. both of Charlotte, N.C.

[73] Assignee: AVM, Inc., Marion, S.C.

[21] Appl. No.: 612,278

[22] Filed: Mar. 7, 1996

[51] Int. Cl.$^6$ ............................................. F16F 9/02
[52] U.S. Cl. ........................ 267/120; 188/277; 267/124; 267/64.11
[58] Field of Search .................... 267/120–127, 267/64.11–64.28; 188/281, 282, 322.22, 322.15, 318, 320, 269, 276, 277, 278; 16/66, 86

[56] References Cited

U.S. PATENT DOCUMENTS

| | | | |
|---|---|---|---|
| 4,156,523 | 5/1979 | Bauer | 267/120 |
| 4,307,875 | 12/1981 | Schnitzius et al. | 16/66 |
| 4,408,751 | 10/1983 | Dodson et al. | 188/277 |
| 4,438,833 | 3/1984 | Schäfer | 188/320 |
| 5,106,065 | 4/1992 | Staton et al. | 188/269 |
| 5,404,972 | 4/1995 | Popjoy et al. | 188/277 |

*Primary Examiner*—Douglas C. Butler
*Attorney, Agent, or Firm*—McAndrews, Held & Malloy, Ltd.

[57] ABSTRACT

A gas spring includes a piston assembly or pack having an additional seal, pressure relief valve, and check valve that increases the output force of the gas spring. Various temperature compensation structures, also added to the piston pack, permits this increase to vary from zero at higher ambient temperatures to a maximum value at very cold temperatures thus achieving a temperature compensation, which varies, in an analog manner, inversely in response to the temperature changes.

8 Claims, 8 Drawing Sheets

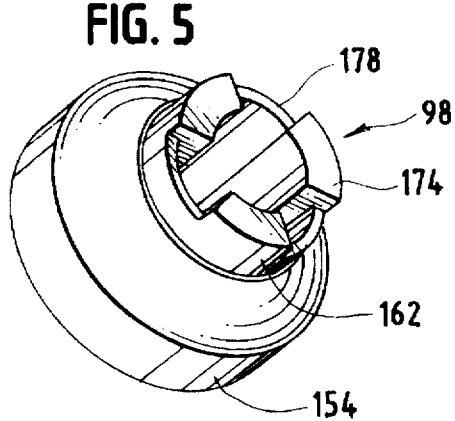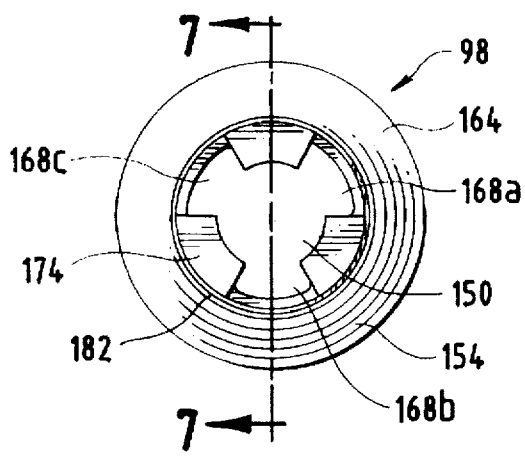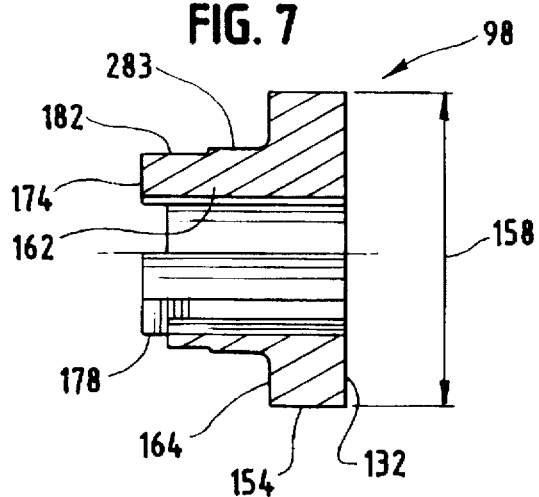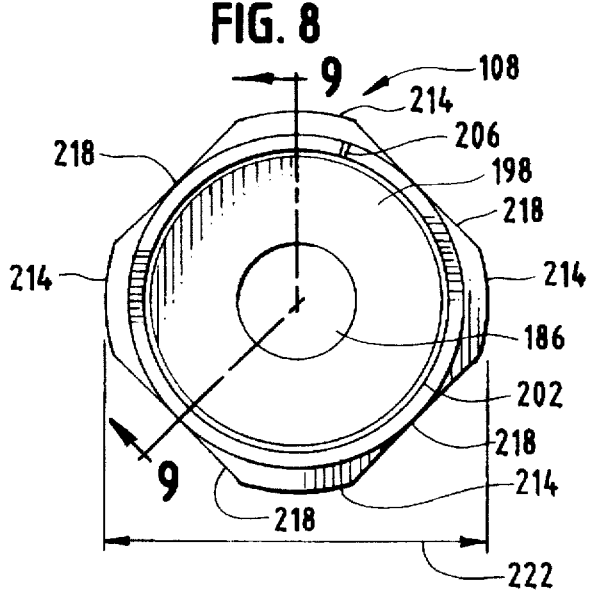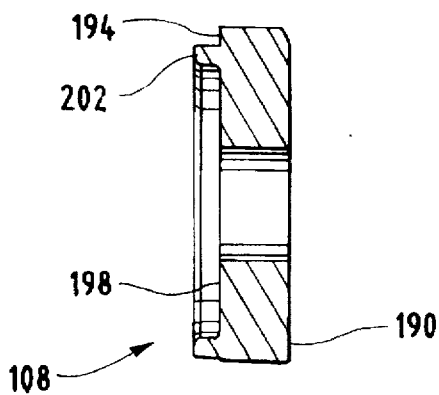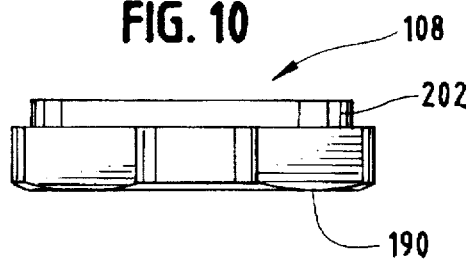

TEMPERATURE COMPENSATED SAFETY GAS SPRING

FIELD OF THE INVENTION

The present invention relates generally to pneumatic or gas springs and, more particularly, to gas springs that will be subject, during their anticipated usage, to considerable temperature variations, as for example, the gas springs that are used in automobiles and like vehicles.

BACKGROUND OF THE INVENTION

Pneumatic or gas springs have long been used to facilitate opening lift gates on automotive vans and wagons, hatches on hatchbacks, trunk lids and engine compartment lids. The gas springs are compressed when the lift gates, hatches or lids are closed. They extend under differential pressure force acting on the spring's rod when the lift gate, hatch and lid is unlatched to be opened, and they are designed to hold the lift gate, hatch and/or hood in a desired opened position until a person applies a positive closing force to them.

The art has long recognized that a serious problem exists in using gas springs in outdoor environments, such as are normally experienced when gas springs are used, for example, on automobiles. Ideally the gas spring should maintain the lift gate, hatch, and/or lid in an open position, where it was placed, and should respond to a reasonably consistent or uniform closing force throughout the temperature range through which, it is anticipated, that they will be used. For instance, gas springs are usually designed to provide a specified force at 20° C. According to Charles' Law, when the temperature drops, the pressure in the gas spring and the spring's output force will also drop. At temperatures much below 10° C., the spring may only have a marginal output or lift force such that a person would have to keep one hand on, for example, an open trunk lid—while trying to put something in or take something out of the trunk—to avoid the lid sagging or unexpectedly closing on the person. If the gas spring were designed to provide an adequate force at low temperatures, the force required to close the lid at high summer temperatures may be often excessive, particularly for a frail person.

Those working in the gas spring art have, over the years, proposed numerous solutions to this long standing, gas-spring temperature-pressure variation problem. Many have focused compensating for temperature changes by adding various temperature sensitive valving. For instance, U.S. Pat. No. 1,797,799; U.S. Pat. No. 2,301,318; U.S. Pat. No. 2,971,212; U.S. Pat. No. 2,989,299; U.S. Pat. No. 3,147,967; U.S. Pat. No. 3,163,262; U.S. Pat. No. 3,674,120; German Offenlegungsschrift No. 2051858 dated Oct. 22, 1970; German Offenlegungsschrift No. 2460219 dated Dec. 19, 1974; German Offenlegungsschrift No. 2460267 dated Dec. 19, 1974; laid open Japanese Patent Application No. 52-123435, dated Aug. 5, 1979; Laid Open Japanese Patent Application No. 57-33242 dated Feb. 23, 1982; U.S. Pat. No. 4,408,751; U.K. Patent Application GB-2164118A dated Aug. 29, 1985; U.S. Pat. No. 4,651,979; U.S. Pat. No. 4,785,921; PCT Published Application WO91/03664 dated Mar. 21, 1991; U.S. Pat. No. 5,106,065; and European Patent Application 0622561A1 dated Nov. 2, 1994 disclose gas springs and similar structures that include structure to compensate for temperature variations. In most, if not all of the prior proposals, the added valving or structure was not operative to compensate meaningfully for changes in temperature throughout the entire anticipated temperature ranges. Others did not permit bi-directional damping to the gas spring. Many were quite complicated such that they would be costly to manufacture.

In the latter regard, the cost of manufacture is critical if a solution to the gas spring temperature—pressure variation problem is to be adopted by the automotive industry. As is well known, parts used in automobiles must be capable of being mass produced at minimal costs. The solutions heretofore proposed for this problem have been unable to satisfy this practical, but firm industry cost requirement.

SUMMARY OF THE INVENTION

In principal aspects, the improved gas spring of the present invention includes an additional seal, pressure relief valve and check valve in the piston assembly or piston pack, with these additions affording an increase in the output force of the spring and as a result, a significant safety factor in that the improved gas spring will stay, where placed, in its extended position (as, for example, when a hatch is opened) even though there has been a relatively significant loss of gas pressure (for example, due to gas leakage) which would have caused prior gas springs to sag under the load and to thereby pose a safety hazard to a person. The improved gas spring of the present invention also includes novel temperature compensation means that permit the increase in the the spring output force to vary from zero, at high temperatures, to a maximum value, at very cold temperatures, in an analog manner in response to temperature changes. Importantly, the improved spring of the present invention may be mass-produced at a cost considered acceptable to the automotive industry.

Accordingly, an object of the present invention is to provide an improved gas spring that will remain extended, under load, where positioned even when there has been a loss of gas pressure, as for example due to gas leakage, which would have been sufficient to cause prior art gas spring to retract; and that includes temperature compensation means, which affords an excellent, practical solution to the long standing gas spring temperature variation problem, and that permits the spring to exert a uniform force and to respond to a uniform closing force throughout its operating temperature range while retaining directionally damped control of the spring.

Another object of the present invention is to provide an improved gas spring, as described, where a seal, pressure relief valve and a check valve are additionally included, in the otherwise conventional piston assembly; where the relief valve, in cooperation with the additional seal and check valve, prevent gas passing from the spring's compression compartment to the extension compartment, when the piston assembly is urged toward the compression compartment until the pressure differential between these compartments exceeds a predetermined value; and where the additional seal and check valve permit gas to pass from the extension compartment to the compression compartment when the piston assembly is being extended. A related object of the present invention is to provide a gas spring, as described, where novel temperature compensation means is associated with the added pressure relief valve so that the output force of the spring will change in response to changes in the temperature; and more specifically where the temperature compensation means changes the predetermined amount, in an analog manner and, inversely with respect to changes in the temperature so that the force exerted by the gas spring on, for example, a hatch, will be maintained substantially uniform regardless of temperature changes.

A further object of the present invention is to permit existing gas springs designs to have the advantages of the present invention, that is, a safety factor and temperature compensation, without requiring substantial design modifications.

The above and other objects of the present invention are achieved by an improved gas spring that includes, a cylinder defining an elongated, internal chamber that has an open end and a closed end. A piston rod is received in and extends, in sealed relation to the cylinder, through the open end of the cylinder and is movable toward and away from the closed end of the cylinder. A piston assembly is affixed to the one end of the piston rod within the internal chamber and separates the internal chamber into a compression compartment, which is adjacent to the closed end of the cylinder, and an extension compartment, which is adjacent to the open end of the cylinder. Gas, which is under a pressure higher than atmospheric pressure, is contained in the internal chamber. A check valve permits the flow of gas from the extension compartment to the compression compartment and prevents gas flow from the compression compartment to the extension compartment. A bypass permits the gas to flow from the compression compartment to the extension compartment. A pressure relief valve is disposed in the bypass and permits the flow of gas from the compression compartment to the extension compartment through the bypass when the gas pressure in the compression compartment exceeds the gas pressure in the extension compartment by a predetermined amount. Temperature compensation means varies the predetermined amount linearly, uniformly and in analog fashion, in response with variations of the temperature.

In accordance with a first embodiment of the present invention, the temperature compensation means is carried by the compression compartment side of the piston assembly. The pressure relief valve includes a spool-shaped valve body that has first and second end flanges and a reduced diameter, middle portion disposed between the end flanges. The first end flange is proximal to the extension compartment and has a smaller diameter than that of the chamber to define a flow passage which permits gas flow between the first end flange and the adjacent cylinder wall. The second end flange is proximal to the compression compartment and forms a close, free sliding fit with the cylinder. The bypass includes a flow passage opening to the compression compartment and terminating in a valve seat in the middle portion of the spool-shaped valve body. The temperature compensation means includes a bimetallic or thermally active spring constrained between the end flanges. The spring carries a seal member disposed so as to be adapted to contact the valve seat and thereby prevent the flow of gas therethrough. The end flanges exert a constraining force on the spring that normally biases the spring to a closed position, in which the seal member contacts the valve seat in a sealing relation. The spring is movable to a valve open position, in which the seal member is moved out of contact with the valve seat, in response to the gas pressure in the compression compartment exceeding the gas pressure in the extension compartment by an amount sufficient to overcome the constraining force exerted on the spring by the end flanges. The spring has a coefficient of thermal extension which is substantially less than that of the spool-shaped valve body such that the constraining force exerted on the spring by the end flanges varies uniformly and in an analog manner in response to changes in the temperature.

In accordance with the second and third embodiments of the present invention, the temperature compensation means is also carried by the compression compartment side of the piston assembly. The pressure relief valve includes a valve body having an increased diameter portion forming a close, free sliding fit with the adjacent cylinder wall and a reduced diameter portion which is in fluid communication with the expansion chamber. The bypass includes an axial flow passage opening to the compression compartment and terminating in a valve seat in the reduced diameter portion of the valve body. The temperature compensation means includes a seal ring that is made from an elastomeric or polymeric material, such as rubber or nylon, and that is positioned around the reduced diameter portion of the valve body in a sealing relation with the valve seat. The seal ring has a coefficient of thermal extension which is substantially less than that of the valve body such that the force required to unseat the seal ring from the valve seat (that is, to open the valve) varies, in an analog manner, in response to changes in the temperature.

In a fourth embodiment of the present invention, the temperature compensation means is similarly carried by the compression compartment side of the piston assembly and includes a pair of coil compression springs that cooperate to bias a one-way pressure relief valve member. This valve member controls flow through the bypass from the compression compartment to the extension compartment. The bias exerted by the springs, and thus force required to unseat the one-way valve member, varies in an inversely, analog manner with the axial thermal expansion of a cylindrical bushing that is made from an elastomeric or polymeric material and that is interposed between the springs.

In a fifth embodiment of the present invention, the temperature compensation means and pressure relief valve, which control flow through the bypass, includes a one-way valve member mounted on a flat, which is milled on the piston rod on the extension compartment side of the piston assembly. A bimetallic leaf spring is used to bias the one-way valve to a closed position such that the biasing force required to open the one-way valve varies, inversely in an analog manner, in response to changes in the temperature.

BRIEF DESCRIPTION OF THE DRAWINGS

For a more complete understanding of the present invention and of other objects, advantages and features of the present invention, reference should now be had to the embodiments illustrated in greater detail in the accompanying drawings and specifically described hereinafter.

FIG. 5 is a top perspective view of a main valve body used in the piston assembly of FIGS. 3-5;

FIG. 6 is a top view of the main valve body of FIG. 5;

FIG. 7 is a cross-sectional view of the main valve body taken along line 7—7 of FIG. 6;

FIG. 8 is a top view of the orifice disk used in the piston assembly of FIGS. 3-5;

FIG. 9 is a cross-sectional view of the orifice disk along line 10—10 of FIG. 8;

FIG. 10 is a side view of the orifice disk of FIG. 8;

Figure 1:
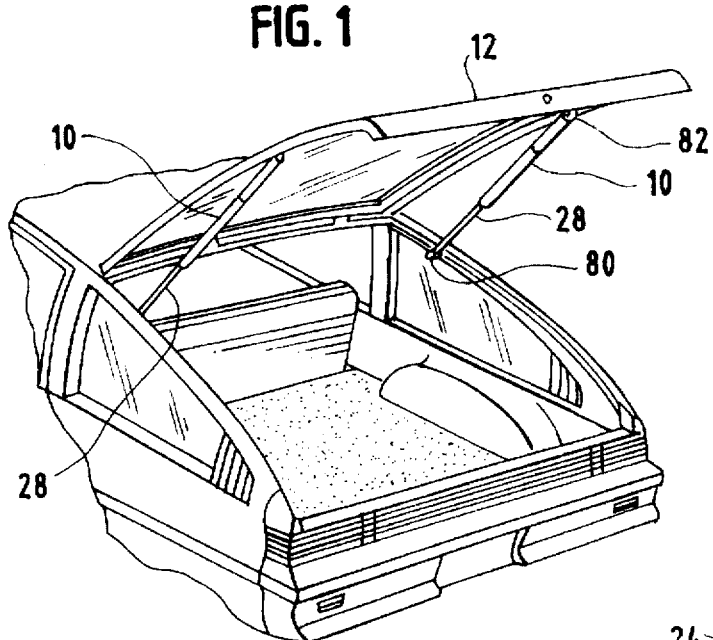
FIG. 1 is a partial perspective view of the hatchback portion of a hatchback style automobile depicting an example of the uses of gas springs of the type encompassed by the present invention.

Throughout the various drawings, the same reference numbers will be used to designate the same or similar parts and components. Also the terms "up", "down", "upper," "lower," "top", "bottom", "right", "left" and similar direction indicating terms are used with reference to how the gas springs are disposed in the drawings and are not intended to be limiting since, as is well known in the art, gas springs may be positioned in a variety of angular dispositions in actual use.

DETAILED DESCRIPTION OF THE PREFERRED EMBODIMENTS

Referring now to the drawings, FIG. 1 illustrates an exemplary use of the gas or pneumatic springs of the present invention.

More specifically, two identical, pressurized gas springs 10 of the present invention are shown in FIG. 1, positioned on opposite side edges of a conventional automobile hatchback style automobile. The automobile's hatch 12 is hinged at its upper edge for movement between an open position, as shown, and a closed position. In the former position, the gas springs 10 are extended to assist in opening the hatch 12 and to support and maintain the hatch in its open position. In the latter position, the gas springs 10 are compressed. It is desirable, from a commercial and customer satisfaction standpoints, that the gas spring will hold the hatch 12 in whatever open position to which it has been moved even if by chance, a spring should suffer a loss of gas pressure. Otherwise if the hatch sags, then it could become a safety hazard to people who are nearby.

Figure 2:
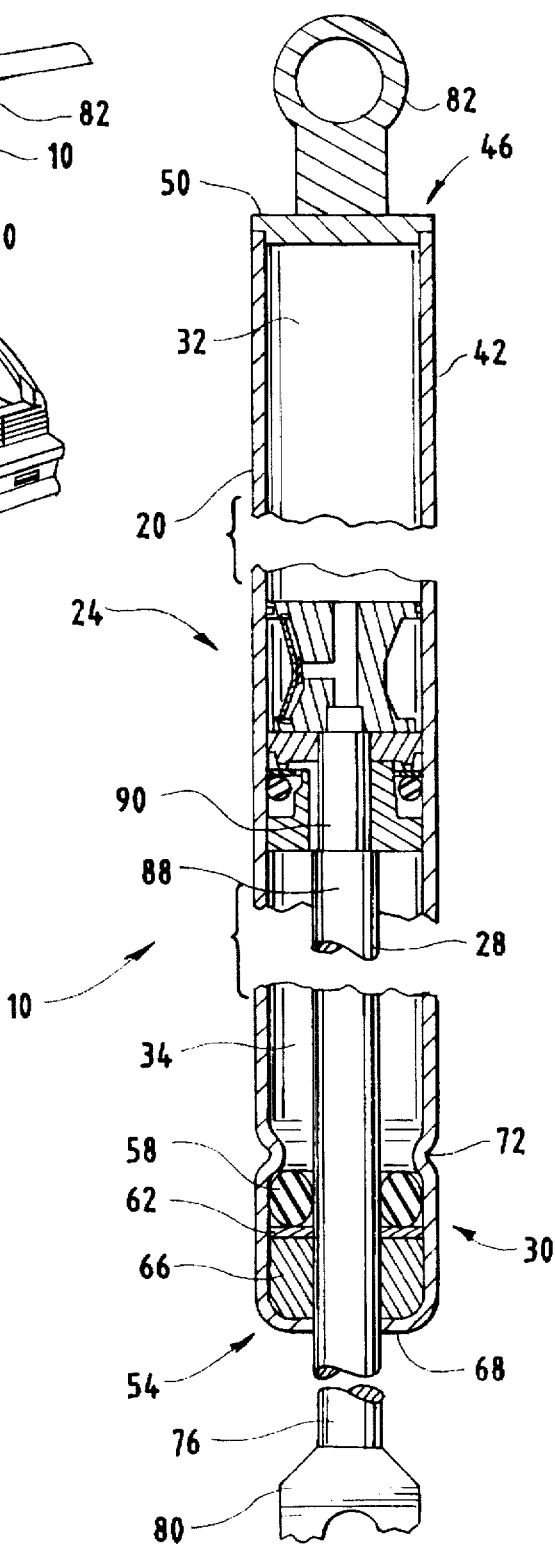
FIG. 2 is an axial cross-sectional view of one embodiment of a temperature compensating gas spring of the present invention.

Referring now to FIG. 2, the gas spring 10 includes a hollow cylindrical cylinder or tube 20, a piston assembly 24, and a piston rod 28. The length of the cylinder 20 and the sizing of the other components is determined by the intended application or use of the spring 10.

The piston assembly 24 is slidably positioned within the cylinder 20 and divides the cylinder 20 into two compartments or chambers 32 and 34 (i.e., a compression compartment 32 and an extension compartment 34, respectively). The volumes of these compartments vary depending on the position of the piston assembly 24 in the cylinder. The piston rod 28 is connected with the end or face of the piston assembly facing the extension compartment 34. The two compartments 32 and 34 are filled primarily with a gas (preferably an inert gas such as nitrogen) under a pressure greater than atmospheric pressure.

Gas springs, particularly in automotive installations, are often pressurized up to around 2000 psi gas pressure, but pressures can be higher or lower depending on the installation. Typically a gas spring with a piston assembly, with a rod having approximately 0.10 inch cross-section area, provides a 5 pound extension force when the cylinder is pre-pressurized at approximately 50 psi, and a 200 pound force when the cylinder is pressurized at 2000 psi. A predetermined amount, for example, 2.5 cc, of hydraulic fluid (such as oil) is also placed in the compartments 32 and 34 to provide lubrication between the piston assembly 24 and the inner side surface of the cylinder wall 42. With some piston assembly designs, such as that shown in U.S. Pat. No. 4,570,912, the hydraulic fluid can also be used to provide a dampening effect during the extension stroke of the spring.

A first end 46 of the cylinder 20, i.e., the end adjacent the compression compartment 32, is closed by an end cap 50 which is secured to the cylinder 20 in a conventional manner such as by welding. The second end 54 of the cylinder 20, that is, the end adjacent the extension compartment 34, is "open". More particularly and is customary, the piston rod 28 projects out of the cylinder through a seal assembly 30 that is, in the conventional manner, positioned in and "closes" the open end 54 of the cylinder 20.

The seal assembly 30 is of conventional design and includes a bi-directional ring seal 58 such as the seal sold under the "QUAD-O-DYN" trademark by the Minnesota Rubber Corporation of Minneapolis, Minn., a washer 62 made of PTFE plastic material such as that sold under the "TEFLON" trademark by E. I. duPont deNemours and Company of Wilmington, Del., and a shaped bushing 66 which has a free, close fit around the rod 28 and within the cylinder 20. A crimp 68 is formed in the open cylinder end 54, and the internal pressure of the gas spring 10 keeps the seal 58 and bushing 66 in position against the crimp 68. A rolled indentation 72 can be used to provide an end stop abutment for piston movement and also to prevent the piston assembly 24 from being "blown out" of the cylinder 20 in the event of catastrophic spring failure.

The washer 62 serves as a resilient backing for the seal 58. The seal 58 provides a multiple circumferential line contact with both the rod 28 and the cylinder wall 42, in effect acting like three small O-rings and imposing relatively low friction forces against the rod 28 during extension and compression strokes. It should be appreciated that other seal assemblies can readily be employed without departing from the scope of the present invention. An example of a suitable alternative seal assembly is illustrated in U.S. Pat. No. 4,570,912, the disclosure of which is expressly incorporated herein by reference.

The projecting end 76 of the piston rod 28 (that is, the end that projects out through the seal assembly 30) terminates in a first connector link 80. That link 80 is rigidly secured to the projecting end 76 by conventional means, such as screw threads or welding. A second connector link 82 is similarly secured to the end cap 50. The connector links 80 and 82 permit the pneumatic spring 10 to be connected, for example, between a vehicle body and a load, for example the lift gate, hood, hatch, trunk lid, etc. of an automobile.

The inner end 88 of the piston rod 28 includes a reduced diameter portion 90 which carries the piston assembly 24. The piston assembly is secured to the reduced diameter portion by conventional means, such as a screw thread (as shown), swaged head, shrink fitting, riveting, etc.

The piston assembly 24 is of conventional design and construction so as to provide controlled flow of gas from one side of the assembly 24 to the other. During a compression stroke, the piston assembly 24 moves toward the end cap 50, and gas in the compression compartment 32 is forced through valving in the piston assembly 24, and into the expanding volume of the extension compartment 34. During an extension stroke, the piston assembly 24 moves away from the end cap 50, and gas in the extension compartment 34 is forced through valving in the piston assembly 24 and into the expanding volume of the compression compartment 32.

First Embodiment:

A first embodiment of the present invention will be described with particular reference to FIGS. 3 and 4 that, as noted, illustrate the relative position of the piston assembly components during the extension and compression strokes, respectively. The piston assembly 24 includes a main valve body 98, an O-ring 102, a disc washer 106, and an orifice disk 108. These components of the assembly 24 are secured to the inner end 88 of the piston rod 28 by a novel temperature compensation (TC) pressure relief valve means 112.

More specifically, the pressure relief valve body 98 has internal threads 114 formed in its first face 116 to accept the threads on the inner end 88 of the piston rod 28. The body 98, the O-ring 102, the disc washer 106 and the orifice disk 108 are referred to hereinafter as the "primary piston" 122 and are representative of an existing, conventional piston assembly to which the TC valve means 112 can be attached to provide the described temperature compensation. The primary piston 122 is described in greater detail in pending U.S. patent application Ser. No. 08/231,200, entitled "Pneumatic Counterbalance Spring," filed Apr. 21, 1994, the disclosure of which is hereby incorporated herein by reference.

Generally, however, the primary piston 122 utilizes a shuttling movement of O-ring 102 and the disc washer 106 to provide a relatively free, by-pass flow during the compression stroke and an "orifice," meter flow during the extension stroke. The valve body 98, as shown in FIGS. 5–7, includes a center passage 150 sized to receive the reduced diameter portion 90 of the piston rod 28. A cylindrical portion 154 of the valve body 98 has an outer diameter 158 (see FIG. 7) sized to form a close, free-sliding fit with the interior surface of the cylinder wall 42. The main valve body 98 also includes a reduced diameter flange 162 extending from a face 164 of the cylindrical portion 154, concentrically with the center passage 150. A plurality of flow passages 168, preferably three 168a, 168b and 168c as shown in FIG. 6, extend longitudinally about the center passage 150 between the bottom face 132 of the valve body 98 and the top 174 of the reduced diameter flange 162. Radial flow passages 178 formed in the top of the flange 162 extend between the outer diameter 182 of the flange 162 and intersect the longitudinal flow passages 168.

The orifice disk 108, as detailed in FIGS. 8–10, includes a center passage 186 sized to receive the reduced diameter portion 90 of the piston rod 28. A first face 190 of the disk 108 is flat and forms a surface which fits flush against the first face 116 of the TC valve means 112. A second face 194 of the disk 108 includes a flat inner surface 198 and an upstanding axial flange 202 positioned outwardly from the flat inner surface 198. One or more orifices 206 extend through the axial flange 202 to provide metered flow of gas during the extension stroke.

As can best be seen in FIG. 8, the outer surface of the orifice disk 108 is formed from alternating curved and flat portions 214 and 218. The flat portions 214 provide flow passages 220 (see FIGS. 3 and 4) between the top and bottom faces 194, 198 of the disk 108. The curved portions 218 define an outer diameter 222 (see FIG. 8) sized to form a close, free-sliding fit with the cylinder wall.

The disk washer 106 has an inner diameter which is larger than the outer diameter 182 of the reduced diameter flange 162 to permit the disk washer 106 to freely slide along the flange 162. The reduced diameter flange 162 includes an increased diameter portion 283 (as illustrated in FIGS. 5 and 7) that serves as a stop for the washer 106. The outer diameter of the disc washer 106 forms a close, free-sliding fit with the inner surface of the cylinder wall 42. The O-ring 102 has an inner diameter which is larger than the outer diameter of the flange 162 and an outer diameter which is slightly larger than the inner diameter of the cylinder wall 42. The O-ring 102 provides a bi-directional sealing effect which prevents oil from leaking past the piston assembly 24.

The TC means 112 is connected to the top or compression compartment facing end of the primary piston 122 and serves to alter operation of the pneumatic spring 10 during the compression stroke, as is explained below. It should also be understood, however, that the TC means 112 may also be used with numerous other types of conventional piston assemblies without departing from the scope of the present invention. Alternatively, the TC means 112 may itself serve as a piston assembly.

Figure 3:
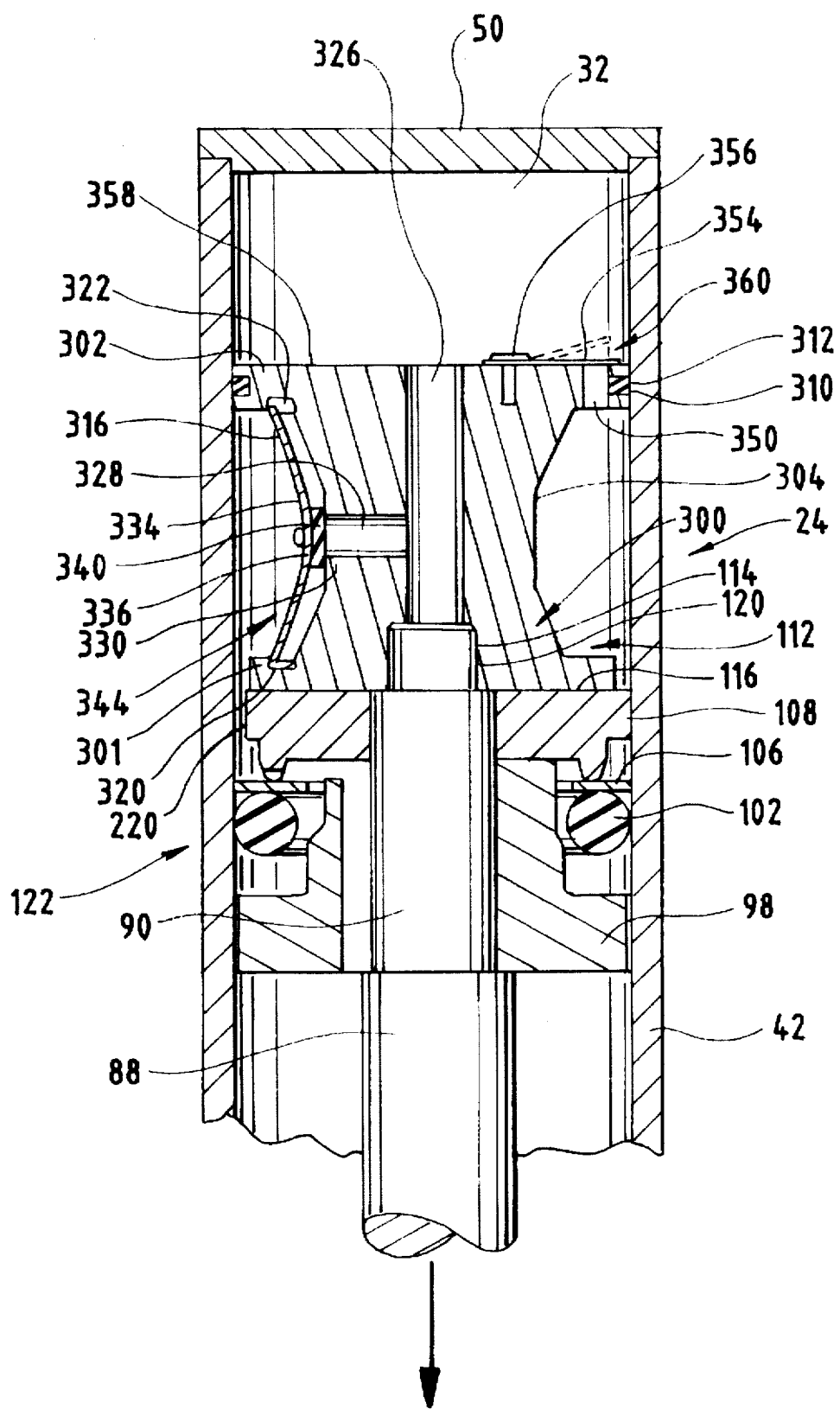
FIGS. 3 and 4 are partial, axial cross-sectional views of gas springs of the present invention showing the piston assembly of FIG. 2 and illustrating the relative position of the piston assembly components during the extension and compression strokes of the piston assembly, respectively.
Figure 4:
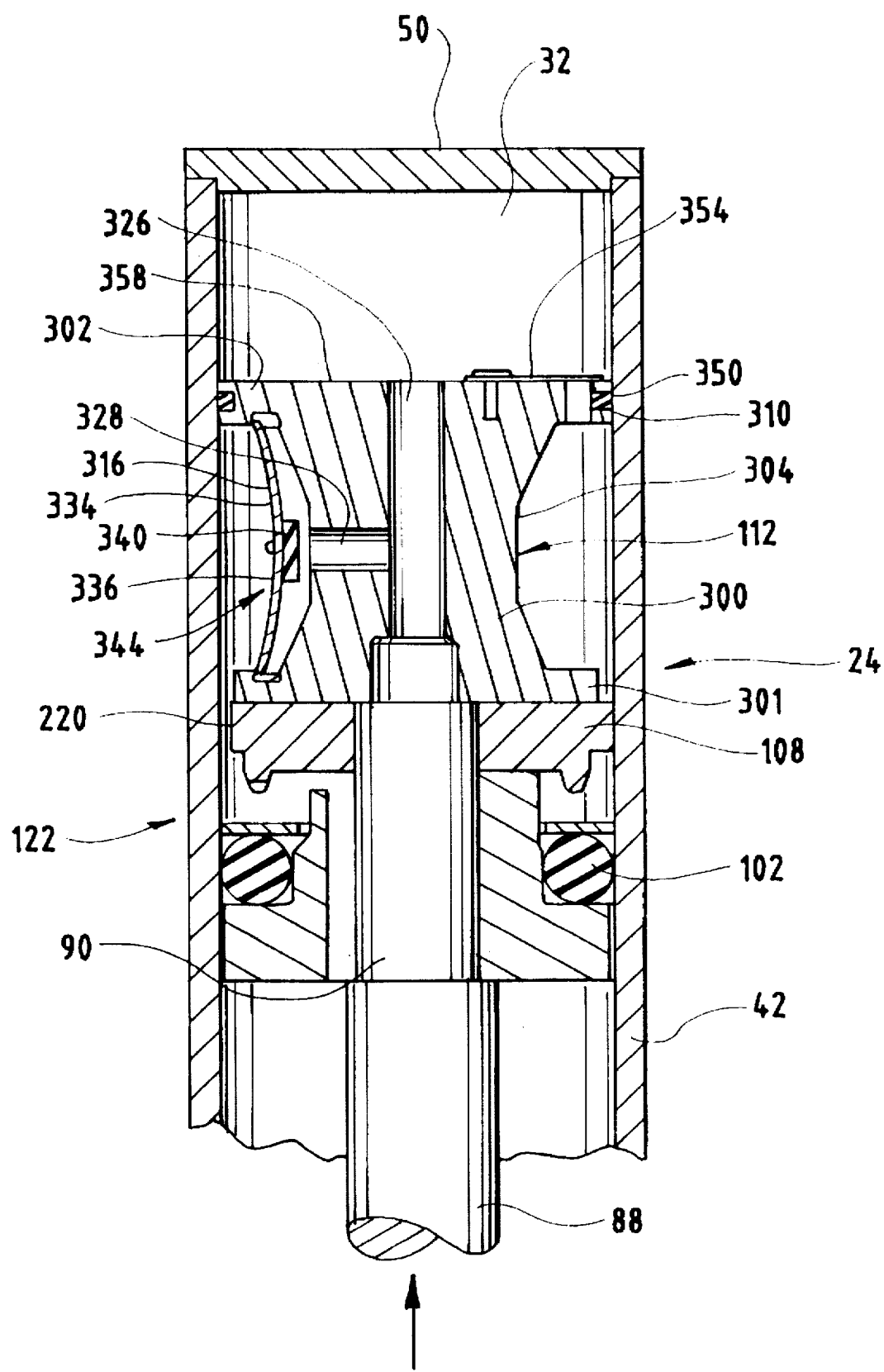

The TC valve means 112 includes a body 300 which is illustrated in FIGS. 3 and 4. The body 300 is spool shaped, has first and second end flanges 301 and 302, respectively, and a reduced diameter middle portion 304. The body 300 may be formed of aluminum, nylon or other suitable plastic material having a relatively high coefficient of thermal expansion. (For example, aluminum and nylon has thermal expansions of approximately $12-13\times10^{-6}$ in/in/deg F. and approximatrely $48-50\times10^{-6}$ in/in/deg F., respectively.)

The first end flange 301 has an outer diameter which is substantially the same as the distance between two opposing flat portions 218 of the orifice disk 108 such that the flow passage 220 also includes the space between the first end flange 301 and the cylinder wall 42. The second end flange 302 has an outer diameter which forms a close, free sliding fit with the cylinder wall 42. Providing a close fit between the second flange 302 and the cylinder wall 42 results in the longest possible lever arm between the piston assembly 24 and the fulcrum, i.e., the bushing 66. An elastomeric O-ring 310 is disposed in an axial groove 312 formed in the periphery of the second end flange 302. The O-ring 310 is compressed between the second end flange 302 and the cylinder wall 42 to provide a bi-directional sealing effect which prevents gas from leaking past the piston assembly 24.

A bowed leaf spring 316 is of conventional construction and is compressed between the end flanges 301 and 302 of the spool body 300. For this purpose, a pair of opposing grooves 320 and 322 are formed in the flanges 301 and 302, respectively, to receive the ends of the leaf spring 316. The bowed leaf spring 316 is formed of steel or other suitable material having a relatively low coefficient of thermal expansion in comparison to that of the body 300. (For example, the thermal expansion of spring steel is approximately $6.5-8.4\times10^{-6}$ in/in/deg. F.) The leaf spring 316 is normally bowed inwardly towards the middle portion 304 of the valve body 112.

A longitudinal, axial flow passage 326 extends concentrically with the axis of the body 300 and opens into the compression compartment 34. A radial flow passage 328 extends perpendicularly from the longitudinal passage 328 and terminates in a valve seat 330 formed in the outer surface of the middle portion 304.

An elastomeric (for example rubber or plastic) valve member 334 is connected to the center portion 336 of the bowed leaf spring 316 by a conventional means, such as a rivet 340. The valve member 334 normally abuts the valve seat 330 in sealing relation. The valve member 334 and leaf spring 316 form a one-way, thermal-responsive check valve 344 which permits by-pass flow of gas from the compression compartment 32 to the extension compartment 34 through the flow passages 326, 328, but blocks gas flow from the extension compartment 34 to the compression compartment 32. The differing coefficients of thermal expansion of the valve body 300 and the leaf spring 316 provide the force required to unseat the valve member 334 from the valve seat 330. This force varies inversely but directly, in an analog manner, with variations in the temperature.

Alternatively or in addition to relying on the differing coefficients of thermal expansion between the materials of the spring 316 and valve body 300 to provide the force to unseat the valve member 334, the spring 316 could have a conventional linear bimetallic construction. This construction would provide the same force and function.

A second longitudinal flow passage 350 extends through the first flange 301 of the body 300. A flat leaf spring 354 is attached to the second face 358 of the body 300 by a fastener 356 such as a rivet, threaded fastener, etc. The leaf spring 354 forms a one-way check valve 360 which controls flow through the second longitudinal flow passage. The check valve 360 permits gas flow from the extension compartment 34 to the compression compartment 32, but prevents gas flow from the compression compartment 32 to the extension compartment 34.

The lifting and/or maintaining force provided by the gas spring 10 is due primarily to the pressure differential that exists and acts on the cross-sectional area of the piston rod 28. The pressure differential is equal to the difference between atmospheric pressure acting on the projecting end 76 of the rod 28 and the absolute pressure of the gas in the compression compartment 32 acting on the area of the rod end attached to the piston assembly 24.

If the pressure differential is not sufficient to support the external load applied to the piston rod 28 (for example, the weight of the hatch 12), the rod 28 will start to retract, compressing the gas charge in compression compartment 32 while decreasing the pressure in extension compartment 34. The piston assembly 24 and rod 28 will continue to retract until the pressure differential acting on the second face 358 of the body 300 provides sufficient force to support the load imposed on the piston rod. The application of an additional external, deliberate force, (for example, applied by a person attempting to close the hatch 12) increases the pressure in the compression compartment 32 to the point where the gas pressure is sufficient to move the valve member 334 out of contact with the valve seat 338, as illustrated in FIG. 4. When the valve member 334 is unseated, the gas in compression compartment 32 can flow past the lower radial flange 301 of the body 300 and through the flow passages 220 provided by the flat portions 218 of the orifice disk 108. Friction between the O-ring 102 and the cylinder wall 42 causes the O-ring 102 to shuttle off the disc washer 106 when the piston assembly 24 is moved toward the closed end 46 of the cylinder 20. This allows the disc washer 106 to move away from the axially projecting flange 202 of the orifice disc 108, permitting the gas to flow freely through radial flow passages 178 into the longitudinal flow passages 168 and into the expanding volume of the extension compartment 34.

As will be recognized by those skilled in this art, the axial length of the body 300 and the length of the bowed leaf spring 316 may be dimensioned so that a predetermined pressure is required to lift the valve member 334 off the valve seat 338 and so that changes in the temperature will result, in analog changes, in this pre-determined pressure. Thus it will be possible for skilled artisans to "tailor" the valve lifting pressure to the requirements necessary to stabilize the load over the anticipated range of temperatures to which the gas spring will be exposed. More specifically and as was mentioned above, the body 300 is made of material which has a higher coefficient of thermal expansion then that of the material from which the leaf spring 316 is made such that an increase in temperature will cause the body 300 to expand to a greater degree than the leaf spring 316. This, in turn, reduces, in an analog manner, the constraining force on the end of the leaf spring 316, thus reducing the seating force on the elastomer valve member 334. Consequently, the force that would otherwise be required to compress the spring 316 and unseat the valve member 334 is reduced. The same is true if the spring 316 has a bimetallic construction.

The reverse is also true. When the temperature is extremely low, there may not be sufficient pressure within the gas spring 10 to counterbalance the load imposed by the weight of the hatch 12. At such a low temperature, again the piston assembly 24 and rod 28 retract within the cylinder 20 as in the scenario previously related. However, in the low ambient temperature the body 300 contracts, applying a greater restraining force on the leaf spring 316, thereby increasing the force required to lift the valve member 334 from its seat 330.

Figure 11:
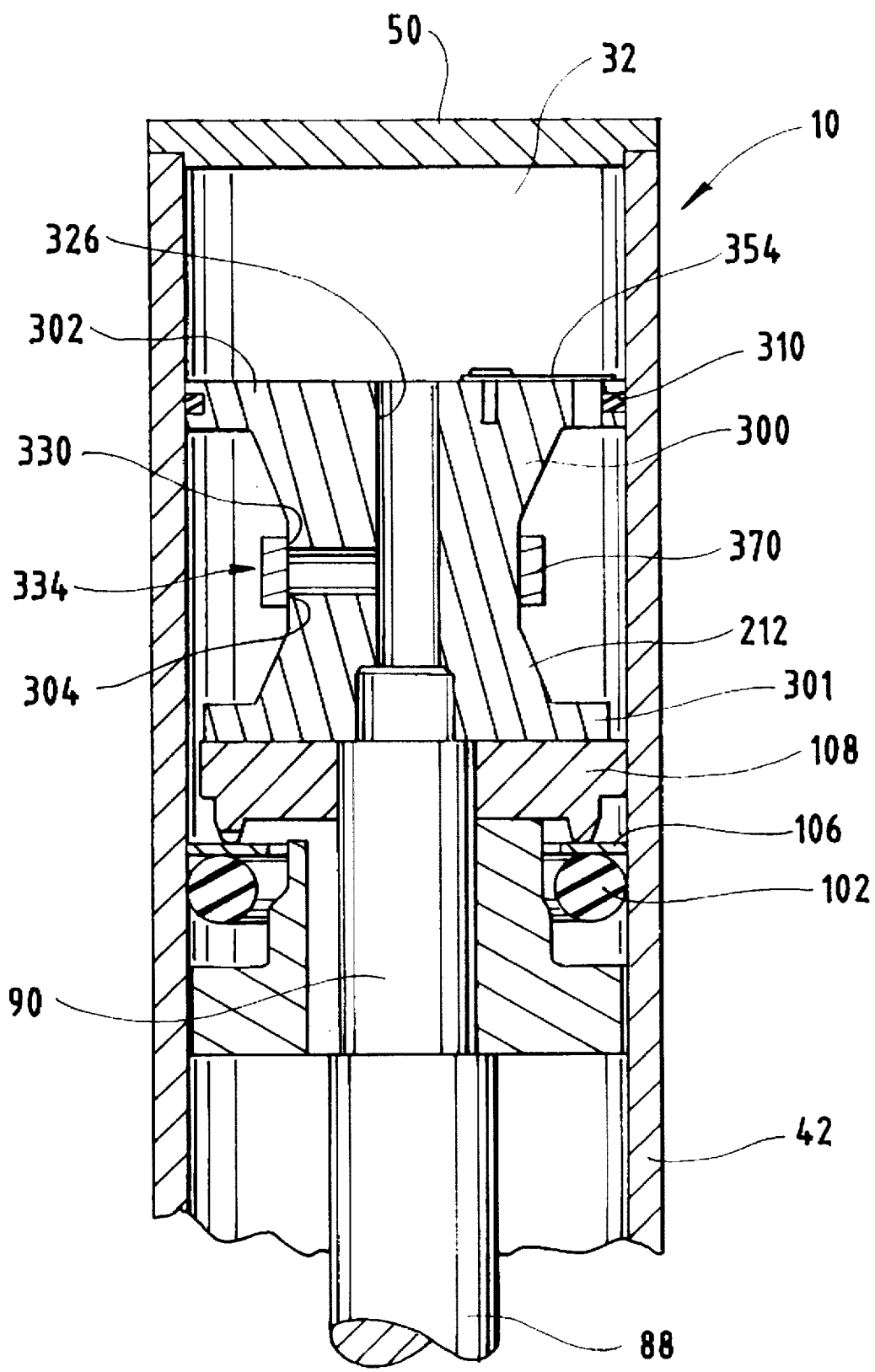
FIG. 11 is a partial, axial cross-sectional view of a gas spring of the present invention showing a second embodiment of the temperature compensation means of the present invention.

Second Embodiment:

Referring to FIG. 11, a second embodiment of a gas spring of the present invention is described. The second embodiment differs from the first embodiment (illustrated in FIGS. 1–10) in that the former utilizes a seal ring 370 to function as the thermal responsive check valve 344, instead of the leaf spring 316 and valve member 334.

The seal ring 370 is positioned about the middle portion 304 of the body 300 so that it covers the valve seat 330. The seal ring 370 is constructed from an elastomeric or polymeric material, such as rubber or nylon, whose elasticity varies proportionally with respect to variations in temperature. Preferably, the seal ring 370 produces zero stress at 100° F., and the stress increases linearly as the temperature is decreased.

During the compression stroke, the pressure in the compression compartment 32 increases until it reaches a level sufficient to unseat the seal ring 370 from the valve seat 330. When the ring 370 is unseated, the gas in the compression compartment 32 can flow past the sealing 370 and into the expending volume of the expansion compartment 34, as described above in connection with the first embodiment.

Figure 12:
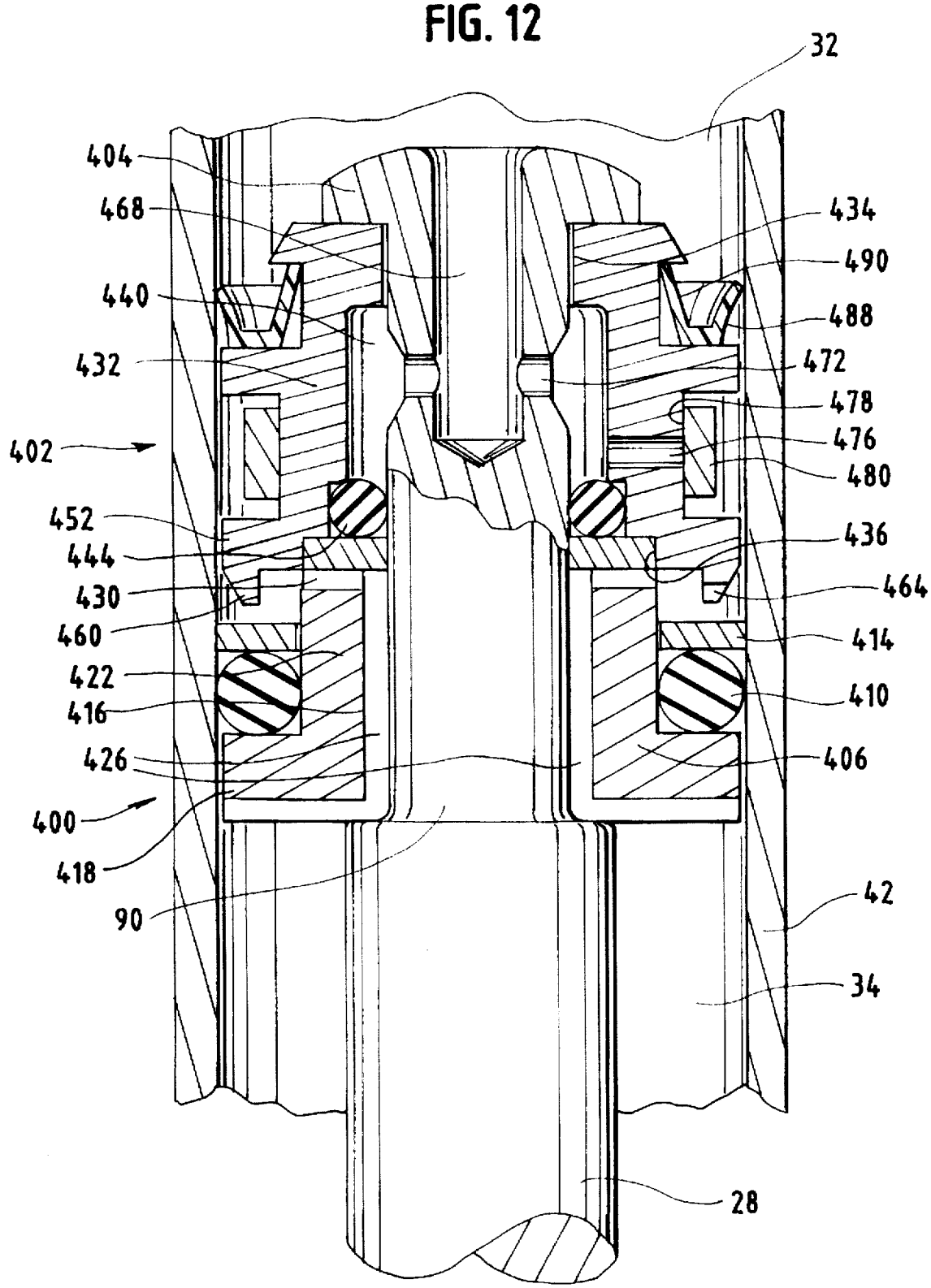
FIG. 12 is a partial axial cross-section view of a gas spring of the present invention showing a third embodiment of the temperature compensation means of the present invention.

Third Embodiment:

A third embodiment of a gas spring of the present invention is illustrated in FIG. 12. The piston assembly of the third embodiment, a primary piston 400, and a temperature compensation ("TC") pressure relief valve means 402 are secured to the reduced diameter portion 90 of the piston rod 28 by the swaged end 404 of the rod 28. The primary piston 400 includes a valve body 406, an O-ring 410, and a disc washer 414. These components of the primary piston 400 are structurally and functionally similar to those of the primary piston 122 of the first embodiment.

The valve body 406 also includes an axial passage 416 sized to receive the reduced diameter portion 90 of the piston rod 28. The lower shoulder portion 418 of the valve body 406 has an outer diameter sized to form a close, free-sliding fit with the adjacent interior surface of the cylinder wall 42. The valve body 406 further includes a reduced diameter annular portion 422 that extends from a top face of the cylindrical portion 418, concentrically with the center passage 416. A plurality of longitudinal flow passages 426 extend longitudinally about the center passage 416 between the bottom face of the valve body 406 and the top of the reduced diameter annular portion 422. Radial flow passages 430, which are formed in the top end of the annular portion 422, extend between the outer surface of the flange 422 and intersect the longitudinal flow passages 426.

The TC means 402 includes a valve body 432 having a center passage 434 sized to receive the reduced diameter portion 90 of the piston rod 28. The body 432, which may be made by conventional powdered metal technology, also includes a counterbore 436 formed in its bottom face and sized to receive the upper end portion of the flange 406 of the main valve body 402. A portion of the counterbore 436 defines the lower end of an intermediate chamber 440 between the piston rod 28 and the second valve body 432. An O-ring seal 444 is positioned at the bottom end of the intermediate chamber 440. A chevron seal could be used in place of the O-ring seal 444, but the latter is more economical and should afford better control of tolerances. The seal 444 engages the piston rod 28 on its I.D. and the body 432 on its O.D. to form a seal between the chamber 440 and the expansion compartment 34.

The valve body 432 has first and second increased diameter flanges 448 and 452 forming a close, free-sliding fit with the cylinder wall 42, and has a reduced diameter, middle portion 456, which is positioned between the flanges 448 and 452. An annular flange 460, is diametrically outwardly from the flange 422, and is on the bottom facing of the flange 452. The flange 460 projects downwardly toward the expansion compartment 34. One or more radially extending orifices 464 are in the flange 422.

The O-ring 410 and disc washer 414 are mounted on the reduced diameter flange 422 for shuttle movement between the projecting flange 460 and the top face of the cylindrical portion 418. During the compression stroke, friction between the O-ring 410 and the cylinder wall 42 causes the O-ring 410 to lift from the disc washer 414 and seat against the top face of the cylindrical portion 418. This allows the disc washer 414 to move down and away from the annular flange 460. Conversely, during the extension stroke, friction between the O-ring 410 and the cylinder wall 42 forces the disc washer 414 upward, compressing the disc washer 414 against the flange 460. In this position, the orifice 464 in the annular flange 460 provides controlled, metered flow between the extension and compression compartments 32 and 34.

A longitudinal or axial flow passage 468 is drilled in the reduced diameter portion 90 of the piston rod 28 and opens, at its upper end, into the compression compartment 34. A radial flow passage 472, which is near the lower end of passage 468, extends perpendicularly from the longitudinal passage 468 and opens into the intermediate chamber 440. A second radial flow passage 476 extends through the second valve body 432 between the intermediate chamber 440 and a valve seat 478 formed in the outer surface of the middle portion 456.

A seal ring 480, similar to the seal ring 370 described above in connection with the second embodiment, is positioned about the middle portion 456 of the valve body 432 in a sealing relation with the valve seat 478. Like the ring 370, the seal ring 480 is constructed from an elastomeric or polymeric material such as rubber or nylon, whose elasticity varies inversely proportionally, in an analog manner, with variations in temperature. Preferably, the seal ring 480 produces zero stress at 100° F. and the stress increases linearly as the temperature decreases.

The seal ring 480 functions as a one-way check valve which permits gas to flow from the compression compartment 32 to the expansion compartment 34 during the compression stroke. Specifically, the exertion of a compressing force on the cylinder rod 28 increases the pressure in the compression compartment or chamber 32 to a predetermined amount or level sufficient to unseat the seal ring 480 from the valve seat 478. When the seal ring 480 is unseated, gas flows past the seal ring 480 and then between the second flange 452 and the cylinder wall 42. Movement of the piston assembly 400 towards the compression chamber 32 causes the disc washer 414 to move away from the axially projecting flange, as explained above, permitting the gas to flow freely through the radial flow passage 430 into the longitudinal flow passages 426 and into the expanding volume of the extension compartment 34.

Conversely, during the expansion stroke, the seal ring 480 seats against the valve seat 478, preventing gas from flow between from the extension chamber to the compression chamber through the longitudinal flow passage. Flow between from the expansion chamber to the compression chamber is permitted, however, by a lip seal 488 mounted in an annular recess 490 in the outer surface of the second valve body 406 adjacent its upper end. The lip seal 488 operates as a one-way check valve which permits gas to flow past the first flange 448 from the expansion compartment or chamber 34 to the compression compartment 32 during the extension stroke. During the compression stroke, however, the pressure in the compression compartment causes the lip seal 488 to abut the cylinder wall 42, thereby preventing gas from flowing post the first increased diameter flange 448.

Figure 13:
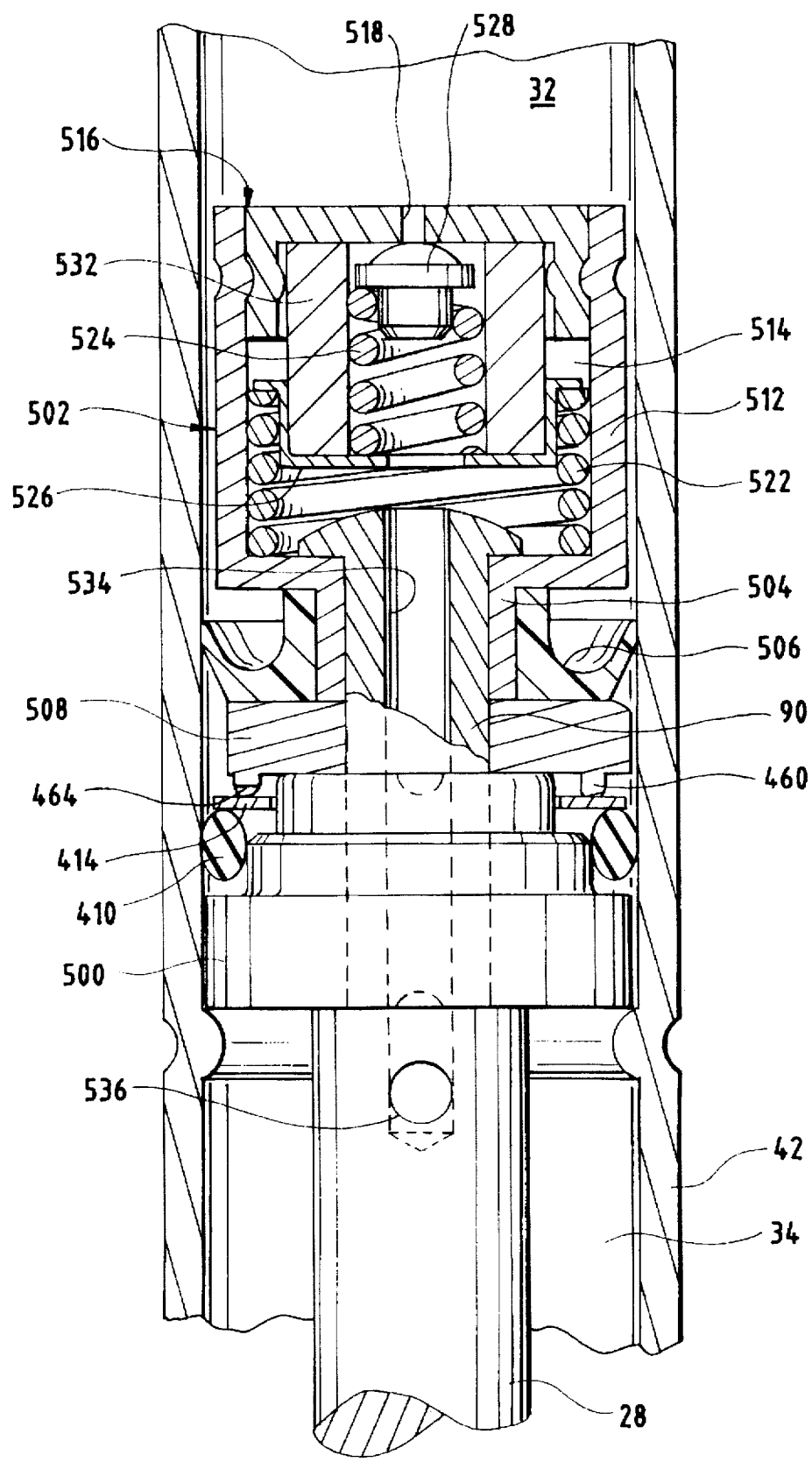
FIG. 13 is a partial axial cross-sectional view of a gas spring of the present invention showing a fourth embodiment of the temperature compensation means of the present invention.

Fourth Embodiment:

As illustrated in FIG. 13, the piston assembly 500 is structurally and functionally similar to the assembly 400, and accordingly, is not again described in detail here. The TC pressure relief valve means of this embodiment includes a valve body 502 that is carried on the reduced diameter, upper end 90 of the piston rod 28 and held in place by swaging the upper end of the rod.

The valve body 502 has a first, reduced diameter, lower portion 504 whose inner diameter is selected so that the portion 504 tightly fits on the reduced diameter end 90 so as to prevent any fluid (gas or oil) flow therebetween. A conventional cheveron seal 506 is positioned about the outer diameter of the portion 504 and serves to form a seal between the body 502 and the adjacent cylinder wall 42 when the piston assembly 500 is moved toward the compression compartment 32 but not when the assembly 500 is moved toward the expansion compartment 34.

A member 508 is also carried on the reduced diameter end 90. The outer diameter of the member 508 is less than the inner diameter of the cylinder wall 42 so fluid may readily pass therebetween. The member 508 is disposed between the lower end of the portion 504 and the upper end of the piston assembly 500 and includes the downwardly directed flange 460 which, as noted above, has at least one radial orifice 464.

A larger diameter, upper portion 512 of the body 502 extends upwardly from the upper end of the portion 504 and defines an upwardly directed chamber 514 therein. The upper end of the chamber 514 is closed by a cap 516 that has a central aperture 518 therein. A coil compression spring 522, which has an outer diameter substantially the same as the inner diameter of the portion 512, and a smaller diameter coil compression spring 524 are disposed within the cap-closed chamber 514. The lower end of the spring 522 abuts the horizontal, lower end of the portion 512. An annular member 526, which has a generally "Z" cross-section, engages the upper end of the spring 522 and the lower end of the spring 524. The upper end of the spring 524 abuts, carries and guides a movable valve member 528. The springs 522 and 524 bias the member 528 toward the center of the cap 518. When the valve member 528 is in contact with the cap 518, it serves to close the aperture 518 and prevent fluid from passing from the compression compartment 32 into the chamber 514.

An annular bushing 532 is disposed in the chamber 514, axially between the member 526 and cap 516 and radially between the springs 522 and 524. The bushing 532 is designed and made of an elastomeric or polymeric material such that its dimensions will change, primarily in the axial direction, in an inverse, but analog manner, in response to temperature changes. As a result of temperature induced changes in its axial length, the bushing will change the bias exerted on the valve member 528 by the springs 522 and 524, and thus, will change the predetermined gas pressure, in the compression compartment 32, needed to unseat the valve member 528.

The reduced diameter end 90 of the piston rod 28 has an axial passage 534 drilled therein. This passage 534 extends past the end 90 of the rod 28, that is, past the lower end of the piston assembly 500 where it communicates with a cross-bore 536. The cross-bore 536 permits fluid to by-pass from the compression compartment 32 to the extension compartment 34, via the chamber 514 and the passage 534, when the valve member 528 is unseated.

Figure 14:
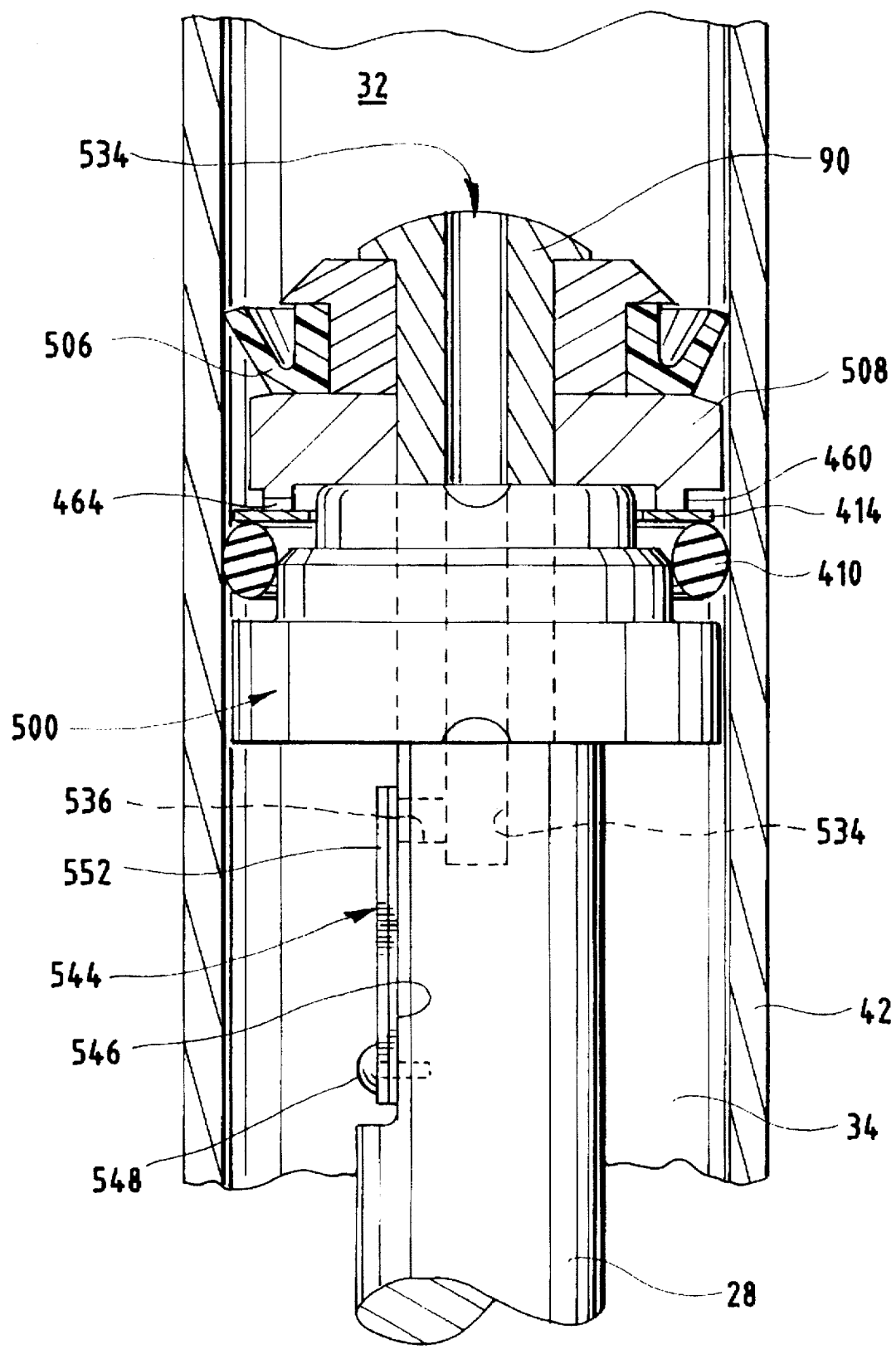
FIG. 14 is a partial axial cross-sectional view of a gas spring of the present invention showing a fifth embodiment of the temperature compensation means of the present invention.

Fifth Embodiment:

Another embodiment of the gas spring of the present invention is illustrated in FIG. 14. In this embodiment, the gas spring may employ the same piston assembly, assembly 500, and the same cooperating member 508, as utilized in the gas spring embodiment described hereinabove in connection with FIG. 13. Both are carried by the reduced diameter end 90 of the piston rod 28. The rod 28 also includes the drilled axial passage 534 and the cross-bore 536, which is disposed below the piston assembly 500 and which, together with the passage 534, permits fluid to by-pass from the compression compartment 32 to the expansion compartment 34.

An annular body 538 is carried on the reduced diameter end 90, with the inner diameter of the body being such that fluid cannot pass between the body 538 and the end 90. The body 538 has an outer diameter substantially less than the inner diameter of the cylinder wall 42 and is additionally secured in place, on the end 90, by swaging the upper end of the end 90.

A chevron seal 542 is disposed about the outer diametric surface of the body 538. Like the seal 506, seal 542 serves to form a fluid tight seal between the body 538 and the cylinder wall 42 when the piston assembly 500 moves toward the compression compartment 32 and permits fluid to pass therebetween when the piston assembly moves toward the extension compartment The TC pressure relief valve means of this embodiment includes a conventional bimetallic spring 544. One end 546 of the spring 544 is secured by, for example, screws, 548 to a "flat" that is milled on the surface of the piston rod 28. This milled flat also extends over the radial outer end of the cross-bore 536. The distal end 552 of the spring 544 overlies the radial outer end of the cross-bore 536 and when overlying this outer end, serves to close it and prevent fluid from flowing through the cross-bore. The spring 544 is selected so that its biasing force will change, inversely and in an analog manner, with changes in the temperature. Thus as in the other embodiments, the lifting/maintaining force exerted by the gas spring's piston rod 28 (that is, the force employed, for example, to hold open the hatch 12) will always remain the same even though the temperature may vary through the entire range of temperatures to which, it is anticipated, the automobile will be subjected during use.

While the presently preferred embodiments of the present invention have been shown and described above, it will be understood, of course, that our invention is not limited thereto since modifications may be made by those skilled in the art, particularly in light of the foregoing teachings. It is therefore contemplated that the appended claims will describe those features which are intended to come within the spirit and scope of our invention.

We claim as our invention:

1. An improved gas spring comprising:

a) a cylinder defining an internal chamber, which is adapted to be filled with gas under pressure, higher than atmospheric pressure, and having an open end and a closed end;

b) a piston rod having one end received, in sealed relation to the cylinder, in the open end of the cylinder and being movable toward and away from the closed end of the cylinder;

c) a piston assembly carried by the one end of piston rod and being movable within the internal chamber, the piston assembly separating the internal chamber into a compression compartment, which is adjacent to the closed end of the cylinder, and an extension compartment, which is adjacent to the open end of the cylinder, with the volumes of the compartments varying in accordance with the position of the piston assembly within the cylinder;

d) first means, which together with the piston assembly, for permitting gas to pass from the extension compartment to the compression compartment in response to movement of the piston assembly toward the extension compartment;

e) means for by-passing gas from the compression compartment to the extension compartment when the piston assembly moves toward the compression compartment;

f) second means for permitting gas to pass through the by-pass means, when the piston assembly moves toward the compression compartment and when the pressure of the gas in the compression compartment exceeds the pressure of the gas in the extension compartment by a predetermined amount;

g) temperature compensation means for changing the predetermined amount, in an analog manner, inversely with changes in the temperature so that the force exerted by the gas spring will be maintained substantially uniform regardless of changes in temperature throughout the anticipated range of temperature to which the gas spring will be exposed, with the temperature compensating means including a spool-shaped valve body having first and second end flanges and a central, reduced diameter portion disposed between the end flanges, the first end flange being proximal to the extension compartment and having a smaller diameter than that of the chamber to define a flow passage permitting gas flow between the first end flange and the cylinder, the second end flange being proximal to the compression compartment and forming a close, free-sliding fit with the cylinder; and a flow passage opening to the compression compartment and terminating in a valve seat positioned the middle portion of the spool-shaped valve body.

2. The improved gas spring of claim 1 including a second spring constrained between the end flanges, the second spring carrying a seal member positioned to engage the valve seat, the end flanges exerting a constraining force on the second spring which normally biases the second spring to a closed position at which the seal member engages the valve seat in a sealing relation, the second spring being movable to an open position at which the seal member disengages the valve seat in response to the pressure in the compression compartment exceeding the pressure of gas in the extension compartment by the predetermined amount, with the second spring having a coefficient of thermal extension which is substantially less than that of the spool-shaped valve body such that constraining force exerted on the second spring by the end flanges changes in response to the changes in the temperature.

3. The improved gas spring of claim 2 wherein the spool-shaped valve body is made of a relatively high thermal expansion material and the second spring is made of a relatively low thermal expansion material.

4. The improved gas spring of claim 2 wherein the spool-shaped value body is connected with the piston assembly and is disposed within the compression compartment.

5. The improved gas spring of claim 1 wherein the temperature compensation means includes an elastic member positioned around the middle portion of the valve body in a sealing relation with the valve seat, the elasticity of the member varying inversely proportionally with the temperature.

6. The improved gas spring of claim 5 wherein the spool-shaped valve body is connected with the piston assembly and is disposed within the compression compartment.

7. An improved gas spring comprising:

a) a cylinder defining an internal chamber, which is adapted to be filled with gas under pressure, higher than atmospheric pressure, and having an open end and a closed end;

b) a piston rod having one end received, in sealed relation to the cylinder, in the open end of the cylinder and being movable toward and away from the closed end of the cylinder;

c) a piston assembly carried by the one end of piston rod and being movable within the internal chamber, the piston assembly separating the internal chamber into a compression compartment, which is adjacent to the closed end of the cylinder, and an extension compartment, which is adjacent to the open end of the cylinder, with the volumes of the compartments varying in accordance with the position of the piston assembly within the cylinder;

d) first means, which together with the piston assembly, for permitting gas to pass from the extension compartment to the compression compartment in response to movement of the piston assembly toward the extension compartment;

e) means for by-passing gas from the compression compartment to the extension compartment when the piston assembly moves toward the compression compartment;

f) second means for permitting gas to pass through the by-pass means, when the piston assembly moves toward the compression compartment and when the pressure of the gas in the compression compartment exceeds the pressure of the gas in the extension compartment by a predetermined amount;

g) temperature compensation means for changing the predetermined amount, in an analog manner, inversely with changes in the temperature so that the force exerted by the gas spring will be maintained substantially uniform regardless of changes in temperature throughout the anticipated range of temperature to which the gas spring will be exposed, with the temperature compensation means including a valve member that is biased by spring means to a position that prevents flow of gas through the passage with the bias exerted by the spring means changing inversely as the temperature changes, and with the spring means including first and second coil compression springs, with one end of the first spring being connected with one end of the second spring by a member whose dimension changes inversely proportionally with changes in temperature.

8. The improved gas spring of claim 7 wherein the spring means is disposed in the compression compartment.

* * * * *